United States Patent
Carpenter et al.

(10) Patent No.: US 6,459,696 B1
(45) Date of Patent: Oct. 1, 2002

(54) METHOD AND SYSTEM FOR AVOIDING DATA LOSS IN COMMUNICATIONS SYSTEMS

(75) Inventors: Frank Carpenter, McKinney; Patrick Jackson, Dallas; Dave Lauson, Allen, all of TX (US); Henry Wong, Goshen, NY (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/102,262

(22) Filed: Jun. 22, 1998

(51) Int. Cl.[7] .................................................. H04J 3/06
(52) U.S. Cl. ........................ 370/350; 370/506; 375/358
(58) Field of Search ............................... 370/505, 506, 370/503, 507, 508, 516, 517, 335, 350; 375/358

(56) References Cited

U.S. PATENT DOCUMENTS

| 4,841,550 A | 6/1989 | George et al. ............... 375/118 |
| 4,860,193 A | 8/1989 | Bentley et al. ............. 364/200 |
| 5,943,376 A | * 8/1999 | Proctor et al. .............. 375/358 |

FOREIGN PATENT DOCUMENTS

| EP | 0425964 A2 | 5/1991 | ............. H04J/3/06 |
| EP | 0522775 A2 | 1/1993 | ............. H04L/5/24 |
| WO | WO92/15159 | 9/1992 | ............. H04L/7/00 |

* cited by examiner

Primary Examiner—Chau Nguyen
Assistant Examiner—D. Trinh
(74) Attorney, Agent, or Firm—John D. Crane; Bracewell & Patterson, L.L.P.

(57) ABSTRACT

A method and system for avoiding data loss in communications systems. The method and system achieve their objects via communications equipment adapted to do the following: designate a first data-producing system controlled by a first clock; designate a second data-producing system controlled by a second clock; record a timing mismatch between the first clock and the second clock; and dynamically adjust data flow between the first and the second system in response to the recorded timing mismatch.

29 Claims, 5 Drawing Sheets

METHOD AND SYSTEM FOR AVOIDING DATA LOSS IN COMMUNICATIONS SYSTEMS

BACKGROUND OF THE INVENTION

1. Technical Field

The present invention relates, in general, to a method and system, to be utilized with wireless communications systems, having cellular architectures which utilize digital clocked systems (such as Time Division Multiple Access (TDMA), Code Division Multiple Access (CDMA), or similar technologies), and which interface with public switched telephone networks (PSTNs). In particular, the present invention relates to a method and system, to be utilized with wireless communications systems, having cellular architectures which utilize digital clocked systems (such as TDMA, CDMA, or similar technologies), and which interface with PSTNs, wherein the method and system increase the reliability of such wireless communications systems by avoiding communication failures at the wireless communication system-PSTN system interfaces.

2. Description of the Related Art

The present invention is related to wireless communication systems, and, in particular, to wireless communications systems which have both a cellular architecture (e.g., cellular telephony, personal communications systems) and which utilize CDMA (or similar technologies) and which interface with public switched telephone networks (PSTNs). Wireless communication refers to the fact that transmission between sending and receiving stations occurs via electromagnetic radiation (e.g., microwave) not guided by any hard physical path. Cellular architecture refers to the fact that the wireless system effects service over an area by utilizing a system that can (ideally) be pictographically represented as a cellular grid. CDMA stands for Code Division Multiple Access, which is a type of spread spectrum technology, originally developed for military application and thereafter adapted for civilian use.

Wireless cellular communication utilizing CDMA is the latest incarnation of a technology that was originally known as mobile telephone systems. Early mobile telephone system architecture was structured similar to television broadcasting. That is, one very powerful transmitter located at the highest spot in an area would broadcast in a very large radius. If a user were in the usable radius, then that user could broadcast to the base station and communicate by radio telephone to the base station. However, such systems proved to be very expensive for the users and not very profitable to the communication companies supplying such services. The primary limiting factor, or problem, of the original mobile telephone systems was that the number of channels available for use was limited due to severe channel-to-channel interference within the area served by the powerful transmitter.

This problem was solved by the invention of the wireless cellular architecture concept. The wireless cellular architecture concept utilizes geographical subunits called "cells" and encompasses what are known as the "frequency reuse" and "handoff" concepts. A cell is the basic geographic unit of a cellular system. Cells are defined by base stations (a base station consists of hardware located at the defining location of a cell and includes power sources, interface equipment, radio frequency transmitters and receivers, and antenna systems) transmitting over small geographic areas that are represented (ideally) as hexagons. The term "cellular" comes from the honeycomb shape of the areas into which a coverage region, served via two or more base stations, is divided when the mathematically ideal hexagonal shape is used to represent the usable geographic area of each of the two or more base stations. It is to be understood that, although the mathematically ideal shape of the cell is a hexagon, in practicality each cell size varies dependent upon the landscape (e.g., a base station transmitting on a flat plane will closely approximate the ideal hexagon, whereas a base station transmitting in a valley surrounded by hills will not closely approximate a hexagon due to the interference from the surrounding hills).

The first large-scale wireless communications system utilizing cellular architecture in North America was the Advanced Mobile Phone Service (AMPS) which was released in 1983. With the introduction of AMPS, user demand for bandwidth was initially low until users became acquainted with the power of the system. However, once users became acquainted with the power of cellular, the demand for the service increased. Very quickly, even the extended number of channels available utilizing the cellular concepts of reduced power output and frequency reuse were quickly consumed by user demand in certain geographic areas, and a problem arose with respect to capacity.

Engineers responded to the problem by devising the Narrowband Analog Mobile Phone Service (NAMPS). NAMPS utilizes frequency division multiplexing to transmit three transmit/receive channels in the same bandwidth wherein AMPS had previously only transmitted one transmit/receive channel. Thus, NAMPS essentially tripled the capacity of AMPS. However, even though NAMPS essentially tripled the capacity of AMPS, the extended number of channels available with NAMPS were quickly consumed by user demand in certain geographic areas, and a problem again arose with respect to capacity.

Engineers responded to this new problem by devising Digital AMPS (or DAMPS, also known as TDMA). In DAMPS/TDMA time division multiple access techniques are utilized to multiplex user data together. Furthermore, digital data compression techniques are utilized at both the transmission and reception ends. These techniques give rise to increased capacity, and clarity, even exceeding that of NAMPS. However, as was the case with both AMPS and NAMPS, the increased bandwidth capacity of DAMPS/TDMA has been quickly consumed by user demand in certain geographic areas.

Subsequent attempts to increase cellular telephony bandwidth capacity tended to be variations on the foregoing described themes. However, it became apparent that some new communications technology would be necessary to give rise to any significant increase in bandwidth beyond that available with the foregoing described technologies. It was decided within the industry that such new technology would be standard CDMA, which stands for Code Division Multiple Access.

Notice that in all the foregoing described technologies, the method of using multiple transmit/receive channels with each such transmit/receive channel utilizing a different pair of frequencies was maintained throughout. Standard CDMA breaks completely with this method of communication.

Standard CDMA utilizes cellular architecture and a type of hand-off. However, in standard CDMA, transmission and reception is done by all users on the same frequency. Standard CDMA is able to achieve this feat by insuring that the signals from different users are adjusted such that the signals do not interfere with each other to the point of being unable to understand the messages from the different users.

The way in which standard CDMA works is somewhat analogous to a situation in which two English speaking persons are communicating in a room wherein many other non-English speakers are also communicating in a language which the two English speakers do not understand. Since the two English speakers do not understand the language spoken by the non-English speakers in the room, the conversations of their non-English-speaking counterparts will be interpreted by the two English speakers as meaningless "noise." Consequently, since the English speakers will attach no meaning to the "noise," the English speakers will be able to disregard the "noise" and continue to engage in their conversation provided that they both speak loudly enough so that each can be understood by the other despite the "noise" generated by their non-English-speaking counterparts. This is true even though all persons in the room are talking, or communicating, in the same band of sound frequencies which the human ear can hear.

Standard CDMA is able to achieve the same affect by modulating the signal of each user within a particular cell with a "pseudo-noise" code which, in effect, will make each user in the cell appear as if each user were, in effect, "speaking a different language," thereby insuring that the meaning of a signal generated by one user within the cell will not be drowned out by the meaning contained within the signal generated by one or more other users in the cell. Provided, of course, that each user speaks "loudly" enough (or transmits enough power) to be understood over the "noise" generated by the other users in the CDMA cell.

Standard CDMA utilizes digital data technology to achieve the foregoing. Standard CDMA utilizes complex digital codes to modulate user data prior to transmission within a cell. The standard CDMA pseudo-noise codes are chosen such that a modulated signal, when transmitted upon a carrier frequency within the cell, approximates white (or Gaussian) noise, and does not greatly interfere with any other signal transmitted upon the same carrier frequency within the cell. Upon reception, a similar pseudo-noise code is used to demodulate the signal and recover the data that was transmitted.

When digital data technology is utilized with the standard CDMA pseudo-noise codes, it is necessary for all transmitters and receivers within a cell to be synchronized to the same digital clock. This synchronization is provided by use of a "pilot" signal which is transmitted by the base station. Each mobile subscriber unit within a cell "locks" to this pilot signal and thereafter utilizes it as the clock signal for digital data-processing.

In standard CDMA, each base station transmits and receives on the same carrier frequency. Furthermore, in standard CDMA, each base station transmits the same period digital code which is utilized as the pilot signal within each cell. Ordinarily, such a situation would give rise to severe interference between cells. Standard CDMA avoids this problem by phase-shifting (or time-staggering) the pilot signal, or digital code, transmitted within adjacent cells. Within standard CDMA, the carrier signal, pilot code, pseudo-noise codes, and phase-shifting (or time-staggering) of the pilot codes utilized in adjacent cells have all been chosen to work together such that inter-cell interference is minimized. Thus, not only does standard CDMA ensure that users in each cell appear to each other as if they are "speaking different languages," but standard CDMA ensures that adjacent cells appear to each other "as if" each cell was in fact "speaking a different language."

It has been stated that when digital data technology is utilized with the standard CDMA pseudo-noise codes, it is necessary for all transmitters and receivers within a cell to be synchronized to the same digital clock. This synchronization is provided by use of a "pilot" signal which is transmitted by the base station. Each mobile subscriber unit within a cell "locks" to this pilot signal and thereafter utilizes it as the clock signal for digital data-processing. The question naturally arises as to the origin of the clock signal used by the CDMA system.

The answer is that the clock signal originates with the Global Positioning System (GPS). The GPS is a network of geostationary satellites which is utilized to provide precise global positioning. Each GPS satellite contains a clock synchronized to the clocks on the other GPS satellites. One of the features of the GPS is that it emits a "ping," or clock signal, every 20 msec. Because each GPS satellite is geostationary, each GPS satellite is at roughly the same distance from the earth's surface (i.e. Geostationary Height). Consequently, each "ping" from a GPS satellite reaches the earth's surface essentially simultaneously.

Because each "ping" reaches the earth's surface essentially simultaneously, CDMA utilizes such pings as its system clock. Thus, the GPS 20 msec ping provides an effective "clock" to synchronize the CDMA transmitters and receivers, and is consequently utilized for that purpose. Thus, the GPS provides an effective way to synchronize a CDMA network which may be spread over a large geographic area.

In many rapidly developing, but previously undeveloped, areas of the world, such as the former Soviet Union, and the Central and South American republics, only CDMA systems are in place. That is, no substantial pre-existing PSTNs are in place. However, in long-developed areas of the world, such as the United States of America, Canada, and the European Union, there are extensive infrastructures of PSTNs present. In such areas, it is necessary for CDMA systems to interface with the PSTN systems in order for CDMA to be commercially viable and to provide seamless communications services to the residents of such areas. Such interfacing poses multiple problems, but one of the most significant arises from the fact that the timing signals utilized by the CDMA systems and the PSTN systems are not synchronized.

A PSTN is a common carrier network that provides circuit switching for the general public. It is usually a domestic communications network that is accessed by telephones, private branch exchange trunks, and data equipment such as modems. One common type of data carried by PSTNs is digitized voice data.

The human voice amounts to an analog (continuous time) signal. However, from a data communications standpoint, it has been found that transmission of the human voice in digital (discrete time) format produces more acceptable results. Consequently, it is necessary to convert the human voice, which is an analog signal, to a digital signal. After transmission, the digital signal is a re-converted to an analog signal which the human ear can hear.

It has been found empirically, that a human voice signal containing at least frequencies up to the 4000 hertz range is acceptable to most listeners. Consequently, it is necessary to sample the voice signal at two times that frequency such that frequencies up to the 4000 hertz range can be adequately captured. That is, it has been found that sampling a voice signal 8,000 times a second will result in acceptable performance.

One way in which the analog to digital conversion is done is known as Pulse Code Modulation (PCM). In PCM systems the analog signal is sampled once every 8000 seconds, which equates to 1 PCM sample every 125 micro-seconds. When a sample occurs, the magnitude of the analog voice signal is noted. Thereafter, some relative scale is utilized to denote that magnitude. Normally, three bits (binary information units, typically denoted by the symbols "0" and "1") are utilized to quantize the analog signal digitally.

Since a PCM system samples data at specific time intervals, a clock signal is needed to synchronize the system. In a PSTN, such a clock signal is derived from what is known as the "PSTN Clock." The PSTN Clock is derived from a centrally located atomic clock located at some central geographic location. There are various of these PSTN Clocks scattered throughout the world. However, for the purposes of this discussion, the central fact to be gleaned is that such PSTN Clocks are not synchronized with the GPS clocks utilized to synchronize the CDMA systems. This lack of synchronization can give rise to several problems, one of which is illustrated in FIG. 1.

Figure 1:
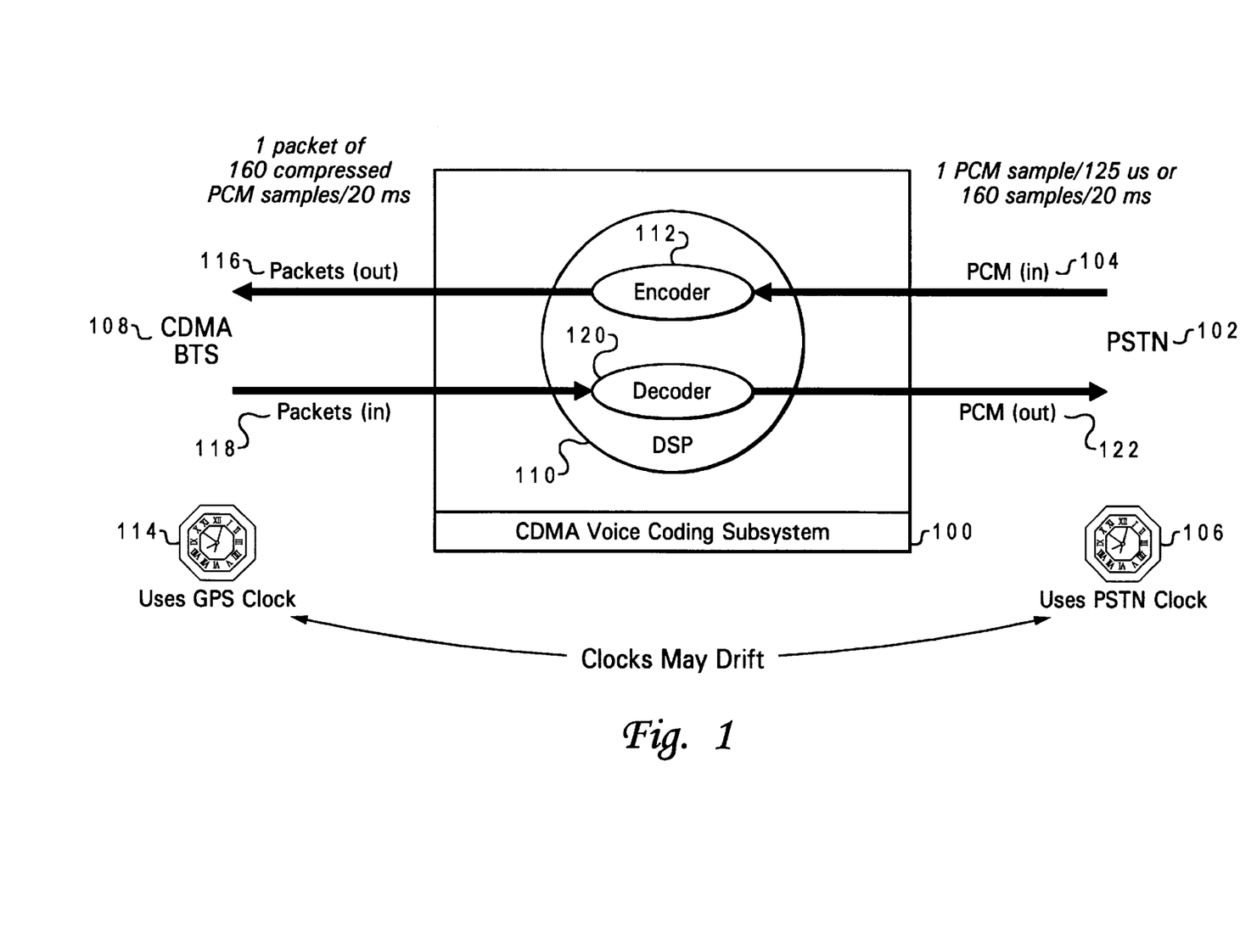
FIG. 1 is a partially schematic diagram which will be used to illustrate problems that arise due to the fact that the clocks used to control CDMA systems and PSTN systems are not synchronized.

Refer now to FIG. 1. FIG. 1 is a partially schematic diagram which will be used to illustrate problems that arise due to the fact that the clocks used to control CDMA systems and PSTN systems are not synchronized. Shown in FIG. 1 is CDMA voice coding subsystem 100. On the right-hand side of FIG. 1 appears PSTN system 102. PSTN system 102 is utilizing PCM and is delivering a PCM input stream 104 to CDMA voice coding subsystem 100. Further shown is that PSTN system 102 utilizes PSTN clock 106, which as has been discussed, is some type of atomic clock at some defined ground-based location.

Shown is that within CDMA voice coding system 100 resides a digital signal processor (DSP) 110. Contained within DSP 110 is PCM-CDMA encoder 112 which accepts PCM sample blocks, signal processes (or encodes) them, and delivers such encoded blocks to CDMA system 108 which appears on the left-hand side of FIG. 1.

Upon receipt of each PCM sample, PCM sample detection circuitry (not shown) interrupts DSP 100 in order to inform DSP 100 that a PCM sample has been received on the PSTN input stream 104. In response to this interrupt, DSP 100 keeps a count of the number of PCM samples received during a particular time interval; furthermore, DSP 100 loads the received PCM sample into a PCM sample input buffer (not shown).

Shown is that CDMA system 108 is controlled, or synchronized by, GPS clock 114. Consequently, when the 20 msec GPS "ping" occurs, CDMA system 108 alerts DSP 110 to the fact that the 20 msec ping has occurred. In response, PCM-CDMA encoder 112 retrieves the stored PCM samples from the PCM sample input buffer (not shown), effectively emptying the PCM sample input buffer (not shown) wherein the previously received PCM samples had been stored. After retrieval, PCM-CDMA encoder 112 processes the retrieved PCM sample block and creates a CDMA packet and places the created CDMA packet into a CDMA packet output buffer (not shown). Thereafter, the created CDMA packet is transmitted from CDMA voice coding subsystem 100 under the dictates of GPS clock 114. The CDMA packet leaves CDMA voice coding subsystem 100 via CDMA packet output stream 116.

An essentially reciprocal operation occurs in the reverse direction. That is, CDMA packets enter CDMA voice coding subsystem 100 via CDMA packet input stream 118. Upon receipt of each CDMA packet, CDMA packet detection circuitry (not shown) interrupts DSP 100 in order to inform DSP 100 that a CDMA packet has been received on the CDMA packet input stream 118. In response to this interrupt, DSP 100 places the received CDMA packet into a CDMA packet input buffer (not shown) and directs CDMA packet-PCM sample decoder 120, upon completion of any processing it may be engaged in, to thereafter accept the received CDMA packet, decode it into PCM samples, and place the PCM samples into a PCM sample output buffer (not shown). Thereafter, the PCM samples are read out of the PCM sample output buffer under the dictates of the PSTN clock 106.

Notice that, irrespective of the direction of flow through CDMA voice coding system 100, since PSTN clock 106 and GPS clock 114 are not exactly synchronized (because the clocks do not communicate), some potential data loss is likely. It has been noted that GPS clock 114 produces a ping every 20 msec. It is also been noted that the PCM system utilizes PSTN clock 106 pulses to produce a PCM sample every 125 micro-seconds (e.g., 1 sec/8,000 samples). Consequently, if PSTN clock 106 and GPS clock 114 were perfectly synchronized (i.e., 20 msec measured on GPS clock 114 was exactly the same as 20 msec measured on PSTN clock 106, and the transition edges of the clocks occurred precisely the same instances), there would be 160 PCM samples clocked through CDMA voice coding subsystem 100, on both PCM input stream 104 and PCM output stream 122, respectively, every 20 milliseconds.

Unfortunately, for the reasons discussed above, PSTN clock 106 and GPS clock 114 are not synchronized. That is, during the normal course of operation of the systems the transition edges of the clock do not occur at the same time or at the same rate (i.e., 20 msec as measured by GPS clock 114 will tend to be slightly different that 20 msec as measured by PSTN clock 106). Furthermore, in the event that the clocks differ by more than 1 PCM sample interval (i.e., by more than 125 micro-seconds) sample transmission will eventually begin to trail behind that necessary and eventually data will be dropped due to the finite size of the buffers. This reality can be made clear by a simple example related to PCM input stream 104.

Assume that the 20 msec ping of GPS clock 114 is either "lagging" or "leading" PSTN clock 106 by a 250 micro-seconds. That is, for every 20 msec deemed to have elapsed by GPS clock 114, according to PSTN clock 106 the elapsed time appears to be 20 msec plus/minus 250 micro-seconds. Admittedly, from the standpoint of a 20 msec interval, plus/minus 250 micro-seconds does not seem that significant, since such lagging or leading amounts to only 1.25% of the 20 msec period.

However, when viewed from the standpoint of the buffers (not shown) of CDMA voice coding subsystem 100, it can be seen that the such leading or lagging can become very significant. If GPS clock 114 is lagging PSTN clock 106 by 250 micro-seconds, then when GPS clock 114 pings, 162 PCM samples will have been collected from PCM input stream 104, rather than PCM samples. Consequently, when PCM-CDMA packet encoder 112 removes 160 PCM samples from the PCM sample input buffer (not shown), two residual PCM samples will remain in the PCM sample input buffer (not shown).

Assuming that GPS clock 114 and PSTN clock 116 remain unsynchronized it can be seen that the PCM packet input buffer (not shown), which has finite capacity, will eventually become full and consequently data will be lost.

If GPS clock 114 is leading PSTN clock 106 by 250 micro-seconds, then when GPS clock 114 pings, 158 PCM samples will have been collected from PCM input stream 104, rather than 106 PCM samples. Consequently, when PCM-CDMA packet encoder 112 removes the PCM samples from the PCM sample input buffer (not shown), it will find that only 158 PCM samples are present and consequently will be unable to construct the appropriately sized CDMA packet.

An analogous state of affairs exists with respect to CDMA packet input buffers (not shown) and the PCM output, or transmit, buffers (not shown). That is, if GPS clock 114 is lagging PSTN clock 106 by 250 micro-seconds, then the when the GPS clock 114 pings, two PCM sample intervals will have transpired with no PCM samples being ejected on the PCM output stream 122. If this state of affairs continues, there will be noticeable "data drop" at relatively periodic intervals, which has been empirically determined to provide unacceptable service to users. That is, a human user can hear and be conscious of such "data drops" and finds such occurrences rankling. Conversely, if GPS clock 114 is leading PSTN clock 106 by 250 micro-seconds, when GPS clock 114 pings, there will still be to PCM samples in the PCM sample output buffer (not shown). Consequently, if this state of affairs continues, the PCM sample output buffer (not shown) will eventually fill and data will be lost.

The foregoing problems associated with the potential CDMA clock and PSTN clock mismatching have been recognized in the prior art. With respect to the PCM sample input buffer problem noted above, the solution that has been effected under the prior art has been to constantly interrupt DSP 110 upon every receipt of a PCM input sample on PCM input stream 104. These interrupts allow DSP 110 to keep a running count of the number of PCM samples in the PCM sample input buffer. Consequently, when GPS clock 114 pings, DSP 110 can determine if more or less PCM samples are present in the PCM sample input buffer then there should be. In response to such determination, DSP 110 either discards the excessive samples present (e.g., when the samples in the PCM sample input buffer are greater than 160 in number), or duplicates the last PCM sample in the PCM sample input buffer when an inadequate number of PCM samples is present (e.g., when the samples in the PCM sample input buffer are less than 160 in number).

An analogous solution has been applied to the problems associated with the CDMA packet input buffers and PCM sample output buffers discussed above. That is, DSP 110 is interrupted every time a PCM sample is clocked out of the PCM sample output buffer. Consequently, DSP 110 is able to keep count of the number of PCM samples in the PCM sample output buffer and is able to discard PCM samples or add PCM samples to the PCM sample output buffer as appropriate in order to ensure that no CDMA input packets are dropped such that no data outage is experienced by users of PSTN system 102. That is, DSP 110, by using a count kept based on the multiple interrupts, is able to control the PCM sample output buffer such that data drop is not detectable by a human user and such that the CDMA packet input buffer does not overflow.

While the foregoing described solutions to the problems associated with lack of synchronization between CDMA system clocks and PSTN system clocks works well, it is also apparent that the system generates a tremendous number of interrupts to DSP 110 in order to effectuate the solution. That is, under the present scheme, DSP 110 is interrupted 160 times in every 20 msec interval (as measured by the PSTN clock) with respect to PCM input stream 104. In addition, DSP 110 is interrupted approximately 160 times in every 20 msec interval (as measured by the PSTN clock) with respect to PCM samples output on PCM output stream 122 (the interrupts are approximately 160 because, as has been discussed, the number of PCM samples actually placed in PCM sample output buffer depend upon the mismatch between the CDMA and PSTN clocks). Consequently, the present solutions to the foregoing identified problems results in approximately 320 interrupts of DSP 110 every 20 msec or 16,000 interrupts per second. From a computational standpoint, such a high number of interrupts is inefficient. That is, since DSP 110 is responsible for controlling all processing within CDMA voice coding subsystem 100, it is apparent that it would be advantageous to reduce the number of interrupts of DSP 110 necessary to achieve the solution to the foregoing problems.

In addition to the foregoing noted problems, there were additional motivations for the present invention. One such motivation is that while in traditional methods there is only one call being handled per DSP 110, there is an impetus in the marketplace to go to multi-call: more than one call being handled per DSP 110. As can be seen, if an attempt to go to multi-call is made, the foregoing noted problems multiply (e.g., there are now as many interruptions of DSP 110 per call as before, except that these interruptions will be multiplied by the number of calls being handled by DSP 110). Thus, marketplace pressure also indicates that it would be advantageous to find a way to maintain the efficacy of the prior art solution, yet do so in a way that reduces the number of interrupts per call.

It is therefore apparent that a need exists for a method and system which will provide a solution to the communication failure problems associated with lack of synchronization between CDMA system clocks and PSTN system clocks, but which will do so in a more computationally efficient way.

SUMMARY OF THE INVENTION

It is therefore one object of the present invention to provide a method and system to be utilized with wireless communications systems having cellular architectures which utilize digital clocked technologies (such as Time Division Multiple Access (TDMA), Code Division Multiple Access (CDMA) or similar spread spectrum technologies), and which interface with public switched telephone networks (PSTNs).

It is yet another object of the present invention to provide a method and system, to be utilized with wireless communications systems having cellular architectures which utilize digital clocked technologies (such as TDMA, CDMA or similar spread spectrum technologies), and which interface with PSTNs, wherein the method and system increase the reliability of such wireless communications systems by avoiding communication failures at the wireless communication system-PSTN system interfaces.

The method and system achieve their objects via communications equipment adapted to do the following: designate a first data-producing system controlled by a first clock; designate a second data-producing system controlled by a second clock; record a timing mismatch between the first clock and the second clock; and dynamically adjusting data flow between the first and the second system in response to the recorded timing mismatch. In one embodiment the first system is a CDMA system controlled by a GPS clock, and the second system is a PSTN system controlled by a PSTN clock.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

It was discussed in the background section that the lack of synchronization between CDMA system and PSTN system clocks gives rise to multiple problems. It was also discussed that prior art solutions to the problems result in a relatively large number of interrupts to the primary digital signal processor.

Embodiments of the present invention provide a solution to the foregoing identified problems arising from lack of synchronization between CDMA system clocks and PSTN system clocks, but without generating the relatively large number of interrupts to the primary digital signal processor. At least one of the embodiments of the present invention achieves the foregoing by removing the responsibility for buffer management from a digital signal processor and instead having the buffer management done via the use of a semi-autonomous processor which utilizes a new way of managing buffers and which communicates with the primary digital signal processor.

It should be recognized that the capability of performing the buffer management via the use of a semi-autonomous processor goes against the teaching of the art and initially was met with a great deal of skepticism. That is, since the foregoing described problems arise from a lack of synchronization between CDMA system clocks and PSTN system clocks, it was believed in the prior art that only a method and system tightly time-coupled to the primary digital signal processor would be able to provide the necessary control to solve the problems arising from the lack of synchronization. It was believed that the introduction of a semi-autonomous processor into such environment would create such a timing "wild-card" that the resulting system would prove unworkable given the tight timing constraints imposed by the nature of the problems arising from lack of synchronization between CDMA system clocks and PSTN system clocks. Consequently, the fact that the present invention worked (or solved the problems associated with lack of synchronization between CDMA system clocks and PSTN system clocks), and worked well, came as a complete surprise since the prior art taught away from the method and system of the present invention.

In addition to the foregoing, the prior art also taught away from the present invention in that one embodiment of the present invention modifies the size of the buffers in near real time. The prior art teaching and assumption was that the size of the buffers would always stay constant, and it was felt that real-time manipulation of buffer sizes would prove impractical. Consequently, the fact that the present invention worked (or solved the problems associated with lack of synchronization between CDMA system clocks and PSTN system clocks), and worked well, came as a complete surprise since the prior art taught away from the method and system of the present invention. An embodiment of the present invention will now be discussed.

One embodiment of the present invention is particularly applicable to the situation described in the background section, above. That is, the situation wherein a CDMA clock and a PSTN clock are not synchronized with each other, but in which each individual clock is relatively invariant when viewed in isolation.

Figure 2:
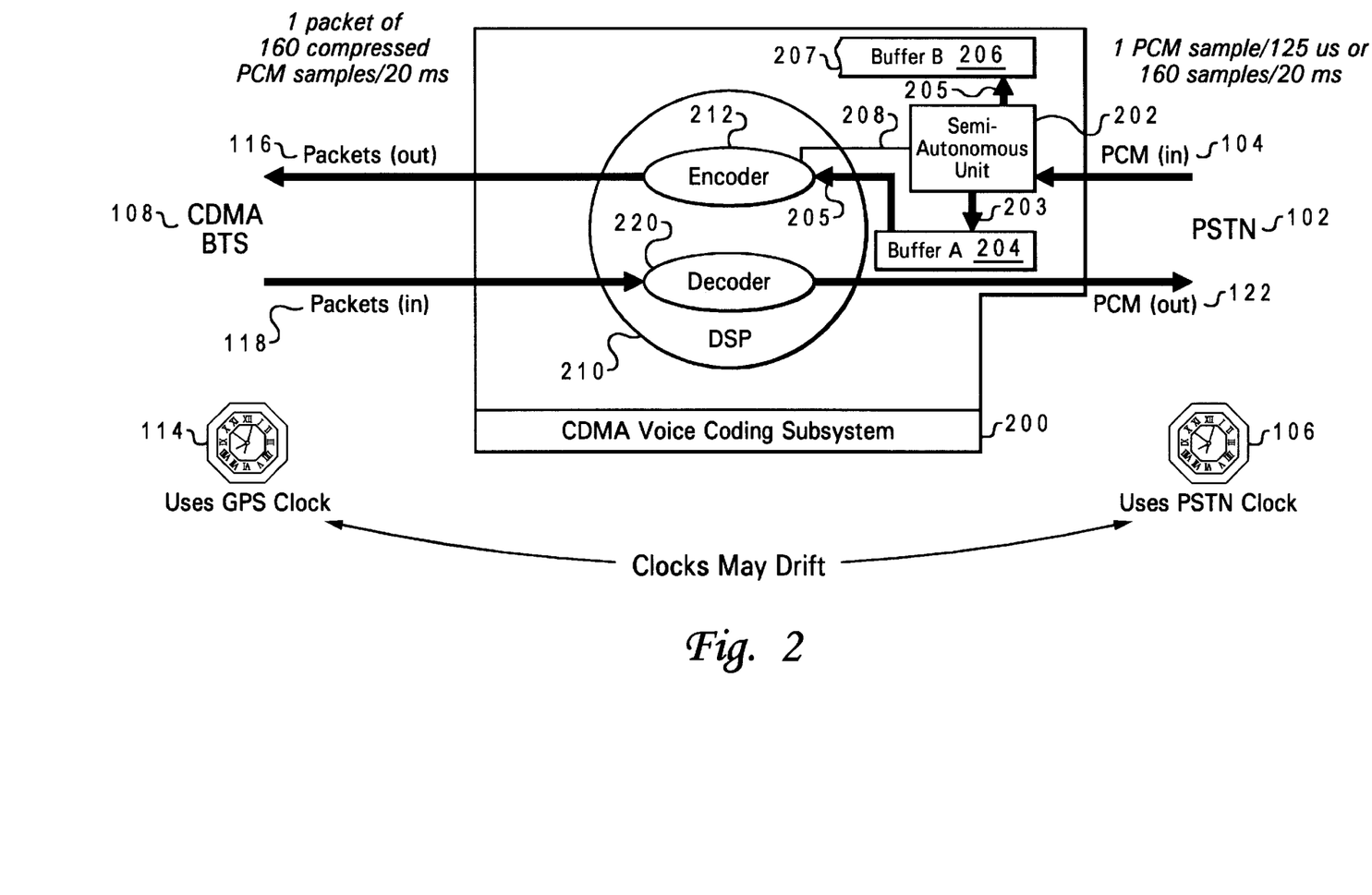
FIG. 2 depicts a system wherein one or more embodiments of the present invention may be practiced.

Refer now to FIG. 2. FIG. 2 depicts a system wherein one or more embodiments of the present invention may be practiced. Shown is CDMA voice coding subsystem 200, which functions, from an overall systems standpoint, essentially in the same way as CDMA voice coding subsystem 100. However, as can be seen in the figure, CDMA voice coding subsystem 200 has been internally modified such that it now contains semi-autonomous unit 202. Further shown is that semi-autonomous unit 202 creates, controls, and communicates with two buffers: Buffer A 204 and Buffer B 206. Semi-autonomous unit 202 communicates with Buffer A 204 and Buffer B 206 via data paths 203 and 205, respectively. Shown also is that PCM-CDMA packet encoder 212 communicates with semi-autonomous unit 202 via communication link 208 and that PCM-CDMA packet encoder 212 has direct access to Buffer A 204 via data path 205. Further shown is that semi-autonomous unit 202 receives PCM samples via PCM sample input stream 104.

In the following discussion, Buffer B 206 will be treated as the working buffer, and as will be shown, the size of Buffer B 206 is dynamically varied in response to system parameters. This fact is illustrated via variable Buffer B boundary 207.

For the sake of conceptual clarity, the following discussion will treat Buffer A 204 and Buffer B 206 "as if" Buffer A 204 and Buffer B 206 are "stationary" buffers from which the contents of one (Buffer B 206) will be transferred into the other (Buffer A 204). However, those skilled in the art will recognize that a preferred implementation of the buffers discussed would be to use what are known in the art as "circular buffers." Consequently, where the following discussion speaks of "transferring," or "loading," the contents of Buffer B 206 into Buffer A 204, it is to be understood that in the preferred embodiment such "transferring" would actually be implemented by communication between semi-autonomous unit 202 and PCM-CDMA packet encoder 212, wherein ranges of pointers, or register addresses, would be exchanged such that the range of pointers defines Buffer A 204. Furthermore, it will be understood by those within the art that concomitant changes would also be made internal to semi-autonomous unit 202 to the pointers which define, and delimit, Buffer B 206 such that the range of pointers would properly define Buffer B 206. Since ranges of contiguous pointers, or register addresses, are utilized and subsequently reutilized to effect Buffer A 204 and Buffer B 206 it can be seen that the register addresses could be represented graphically as a circle; consequently, it is common within the art to refer to such created and managed buffers as "circular buffers."

Due to the inherent complexity of the "circular buffer" scheme itself, it has been found more clear to discuss embodiments of the present invention as if "stationary"

buffers were being utilized which can be read to and written from just "as if" they were fixed computer memory locations. However, it is to be borne in mind that the foregoing discussion, although couched in terms of fixed, or stationary, computer memory buffers, is in a preferred embodiment, implemented via the use of circular buffers by techniques well known to those within the art.

Figure 3:
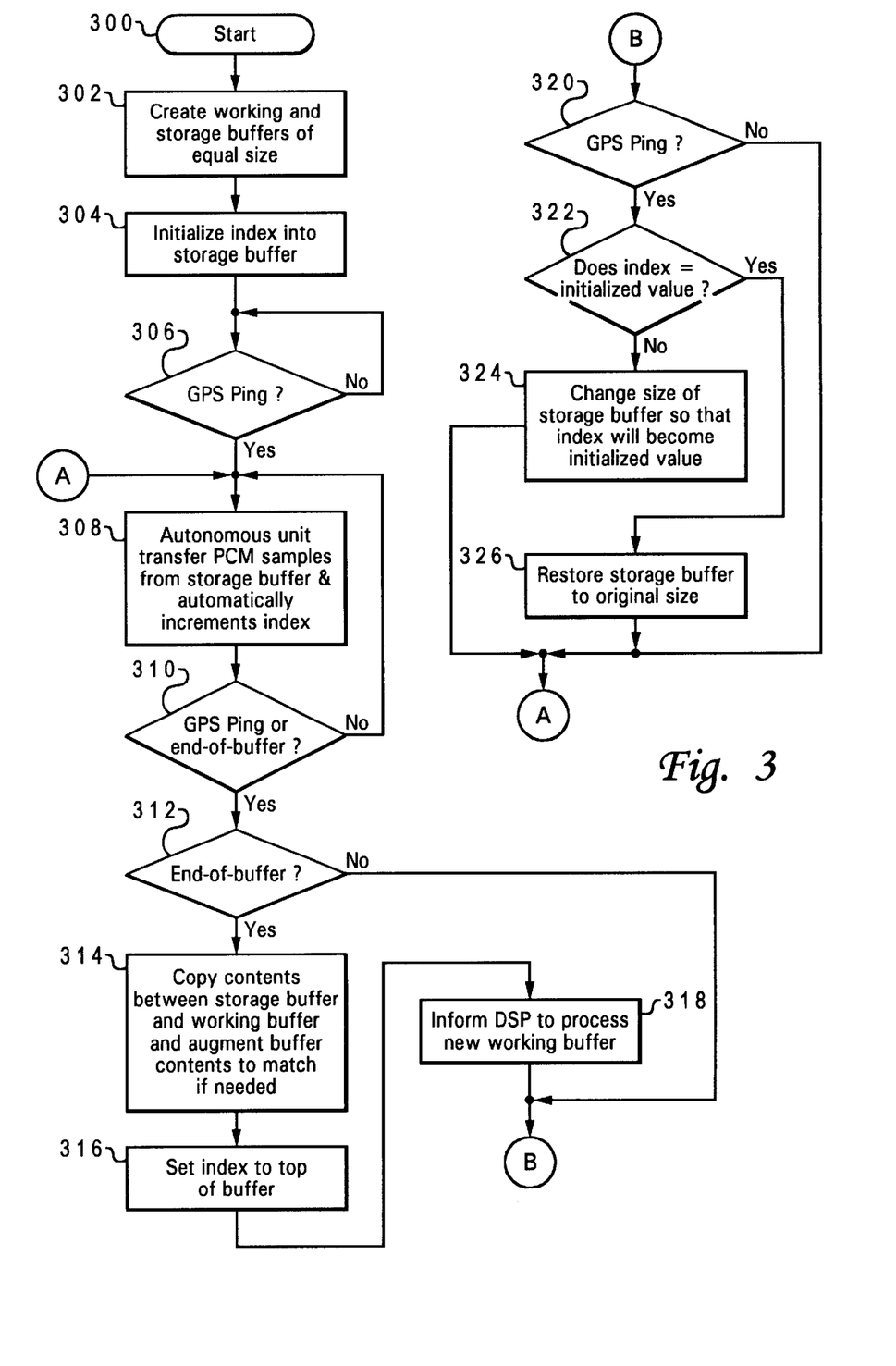
FIG. 3 constitutes a high-level logic flowchart which depicts an embodiment of the present invention.

Refer now to FIG. 3. FIG. 3 will be used in conjunction with FIG. 2 to illustrate an embodiment of the present invention which will alleviate the problems associated with a PCM input buffer, discussed in relation to FIG. 1 above. FIG. 3 constitutes a high-level logic flowchart which depicts an embodiment of the present invention. Method step 300 illustrates the start of the process, which is an entry point where DSP 210 is reset, and which equates to the "powering up" of CDMA voice coding subsystem 200.

Method step 302 depicts that CDMA voice coding subsystem 200 creates working Buffer A 204 and storage Buffer B 206, initially of equal size which in one embodiment equates to working Buffer A 204 and storage Buffer B 206 each being of a size capable of holding exactly PCM samples.

Method step 304 illustrates the initialization of an index which points to the start of storage Buffer B 206. The index points to a register wherein one PCM data sample is stored. Each time PSTN clock 106 pulses, a PCM data sample is stored to a register of storage Buffer B 206, and the index is incremented; thus, some offset of the index is possible should PSTN clock 106 pulses occur before a first ping of GPS clock 114 is received (that is, the index is being advanced even though PCM samples are not being stored to storage Buffer B 206).

Method step 306 shows an inquiry as to whether semi-autonomous unit 202 has received a signal correspondent to a first ping of GPS clock 114. If no signal correspondent to a first ping of GPS clock 114 has been received, the process returns to method step 306. However, if a signal correspondent to a first ping of a GPS clock 114 has been received, method step 308 depicts both that each PCM sample received on PCM input stream 204 by semi-autonomous unit 202 is loaded into storage Buffer B 206 and that the index pointing within storage Buffer B 206 is incremented (which will be done in time with the pulses of PSTN clock 106).

Method step 310 depicts that subsequent to the loading of a PCM sample into, and incrementing of the index pointing to, storage Buffer B 206, a determination is made as to (1) whether the index pointing within storage Buffer B 206 indicates that the last register of the currently-set storage area of storage Buffer B 206 has been reached and loaded with data, or (2) whether a signal corresponding to a GPS clock 114 ping has been received. If neither condition is satisfied, the process proceeds to method step 308 and semi-autonomous unit 202 continues loading PCM samples into storage Buffer B 206. However, in the event that either the last register of the currently-set storage area of storage Buffer B 206 has been reached and loaded with data, or a signal correspondent to a GPS clock 114 ping has been received, the process proceeds to method step 312.

Method step 312 depicts that an inquiry is made as to whether the last register of the currently-set storage area of storage Buffer B 206 has been reached and loaded with data (i.e., is the index pointing at a register beyond the defined end of specified storage of storage Buffer B 206). In the event that the last register of the currently-set storage area of storage Buffer B 206 has been reached and loaded with data, the process proceeds to method step 314 wherein it is depicted that semi-autonomous unit 202 retrieves and augments (by either eliminating a number of the last samples in the data from storage Buffer B 206 if the number of samples is too great, or duplicating the last samples in the data from storage Buffer B 206 if the number of samples is too few) the contents of storage Buffer B 206 such that the total data block size is correct for working Buffer A 204 (it being understood that if the size of storage Buffer B 206 is the same as working Buffer A 204, then no augmentation is necessary), and thereafter transfers the (possibly augmented) contents of storage Buffer B 206 into working Buffer A 204.

Data having been transferred from storage Buffer B 206 into working Buffer A 204, method step 316 illustrates that the index is set to the start of storage buffer B 206 so that it can be refilled. Thereafter, method step 318 indicates that DSP 210 is directed to start processing the working buffer and to utilize PCM-CDMA encoder 212 to encode the PCM data in working Buffer A 204 into a new CDMA packet. Thereafter, the process proceeds to method step 320.

Returning to the inquiry of method step 312, in the event that the last register of the currently-set storage area of storage Buffer B 206 has not been reached and loaded with data, the process proceeds to method step 320 which shows the determination as to whether a signal correspondent to a ping of GPS clock 114 has been received subsequent to that discussed in method step 310. In the event that another signal correspondent to a ping of GPS clock 114 has not been received, the process returns to method step 308. In the event that another signal correspondent to a ping of GPS clock 114 has been received, the process proceeds to method step 322.

Method step 322 depicts that the current value of the index pointing within storage Buffer B 206 index is checked to see if the index is equal to the initialized value (recalling that the index is incremented every time a PCM sample is loaded into storage Buffer B, this the value to which it was set in method step 304, provided that the index is set to "wrap," or reset to the initial index value once the last buffer storage register of the currently-set storage area of storage Buffer B 206 has been used). If the index is equal to the initialized value, the process proceeds to method step 326 which illustrates that the defined storage area of storage Buffer B 206 is set to its original size.

If the index is not equal to the initialized value, then it is known that a slippage occurred and that the currently-set size of the storage area of storage Buffer B 206 is not correct, so method step 324 shows that the storage area of storage Buffer B 206 is changed so that it equates to the actual number of samples received between the last two signals correspondent to the last two GPS clock 114 pings; that is, the storage buffer is adjusted so that the index will hit its target value (i.e., there will be no slippage) when the next signal correspondent to ping of GPS clock B 114 is received—if the index is behind, the buffer size will be increased, and if the index is ahead, the buffer size will be decreased.

Figure 4:
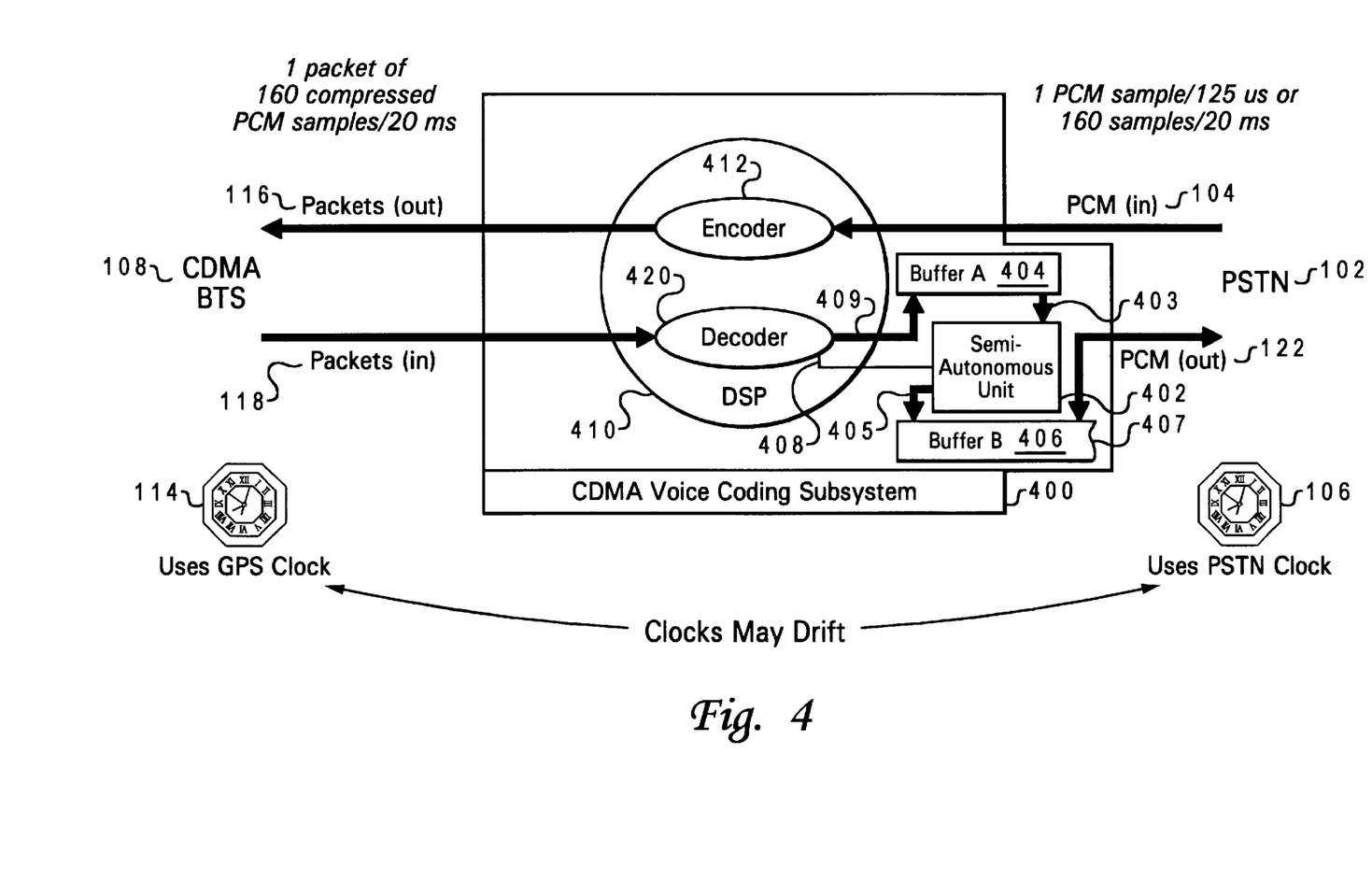
FIG. 4 depicts a system wherein one or more embodiments of the present invention may be practiced.

Refer now to FIG. 4. FIG. 4 depicts a system wherein one or more embodiments of the present invention may be practiced. Shown is CDMA voice coding subsystem 400, which functions, from an overall systems standpoint, essentially in the same way as CDMA voice coding subsystem 100. However, as can be seen in the figure, CDMA voice coding subsystem 400 has been internally modified such that it now contains semi-autonomous unit 402. Further shown is that semi-autonomous unit 402 creates, controls, and communicates with two buffers: Buffer A 404 and Buffer B 406.

Semi-autonomous unit 402 communicates with Buffer A 404 and Buffer B 406 via data paths 403 and 405, respectively. Shown also is that CDMA packet-PCM sample decoder 420 communicates with semi-autonomous unit 202 via communication link 408 and that CDMA packet-PCM sample decoder 420 loads directly to Buffer A 404 via data path 405. Further shown is that semi-autonomous unit 402 delivers PCM samples via data stream 409 to Buffer B 406. Also shown is that Buffer B 406 feeds directly out onto PCM output stream 422.

In the following discussion, Buffer B 406 will be treated as the working buffer, and as will be shown, the size of Buffer B 406 is dynamically varied in response to system parameters. This fact is illustrated via variable Buffer B 406 boundary 407.

For the sake of conceptual clarity, the following discussion will treat Buffer A 404 and Buffer B 406 "as if" Buffer A 404 and Buffer B 406 are "stationary" buffers from which the contents of one (Buffer B 406) will be transferred into the other (Buffer A 404). However, those skilled in the art will recognize that a preferred implementation of the buffers discussed would be to use what are known in the art as "circular buffers." Consequently, where the following discussion speaks of "transferring," or "loading," the contents of Buffer B 406 into Buffer A 404, it is to be understood that in the preferred embodiment such "transferring" would actually be implemented by communication between semi-autonomous 402 unit and CDMA packet-PCM sample decoder 420, wherein ranges of pointers, or register addresses, would be exchanged such that the range of pointers defines Buffer A 404. Furthermore, it will be understood by those within the art that concomitant changes would also be made internal to semi-autonomous unit 402 to the pointers which defined, and the limit, Buffer B 406 such that the range of pointers would properly define Buffer B 406. Since ranges of contiguous pointers, or register addresses are utilized and subsequently reutilized to effect Buffer A 404 and Buffer B 406 it can be seen that the register addresses could be represented graphically as a circle; consequently, it is common within the art to refer to such created and managed buffers as "circular buffers."

Due to the complexity of the "circular buffer" scheme itself, it has been found most clear to discuss embodiments of the present invention as if "stationary" buffers were being utilized which can be read to and written from just "as it" they were fixed computer memory locations. However, it is to be borne in mind that the foregoing discussion, although couch to the terms of fixed computer memory buffers, is in a preferred embodiment, implemented via the use of circular buffers by techniques well known to those when the art.

Figure 5:
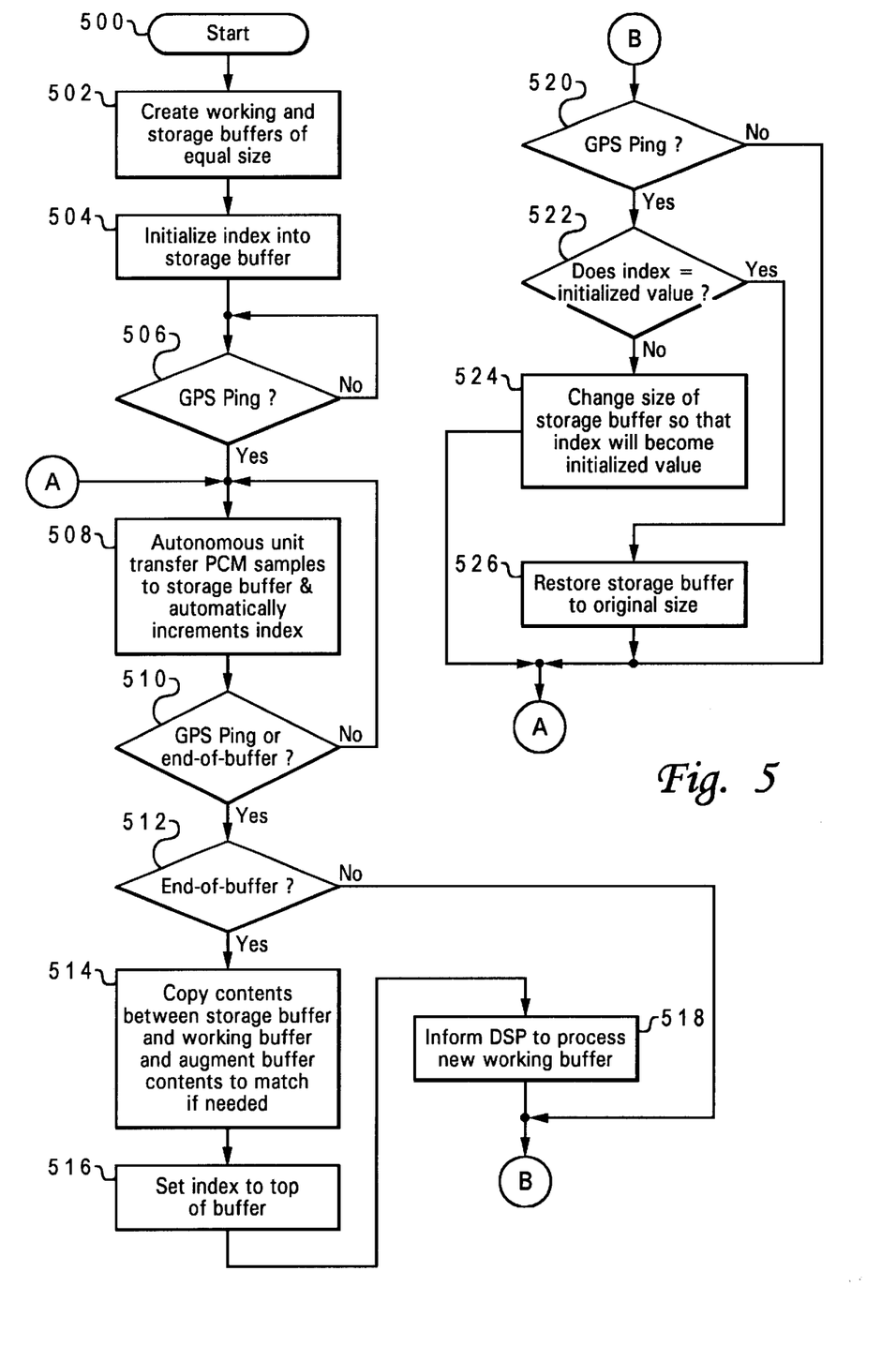
FIG. 5 constitutes a high-level logic flowchart which depicts an embodiment of the present invention.

Refer now to FIG. 5. FIG. 5 will be used in conjunction with FIG. 4 to illustrate an embodiment of the present invention which will alleviate the problems associated with a PCM output buffer, discussed in relation to FIG. 1 above. FIG. 5 constitutes a high-level logic flowchart which depicts an embodiment of the present invention. Method step 500 illustrates the start of the process, which is an entry point where DSP 410 is reset, and which equates to the "powering up" of CDMA voice coding subsystem 400.

Method step 402 depicts that CDMA voice coding subsystem 400 creates working Buffer A 404 and storage Buffer B 406, initially of equal size which in one embodiment equates to working Buffer A 404 and storage Buffer B 406 each being of a size capable of holding exactly 160 PCM samples.

Method step 504 illustrates the initialization of an index which points to the start of storage Buffer B 406. The index points to a register wherein one PCM data sample is stored. Each time PSTN clock 106 pulses, a PCM data sample is transferred out of a register of storage Buffer B 106, and the index is incremented; thus, some offset of the index is possible should PSTN clock 106 pulses occur before a first ping of GPS clock 114 is received.

Method step 506 shows an inquiry as to whether semi-autonomous unit 402 has received a signal correspondent to a first ping of a GPS clock 114. If no signal correspondent to a first ping of a GPS clock 114 has been received, the process returns to method step 506. However, if a signal correspondent to a first ping of a GPS clock 114 has been received, method step 508 depicts both that (1) upon every PSTN clock 106 clock pulse, a PCM sample is transferred onto PCM output stream 122 from storage Buffer B 406 by semi-autonomous unit 402, and (2) that the index pointing within storage Buffer B 206 is incremented (which will be done in time with the pulses of PSTN clock 106). That is, as storage buffer B 406 is emptied, the index is incrementing as the PCM samples are taken from working Buffer B 406 (that is, the index is being advanced even though PCM samples are not being transferred from storage Buffer B 406).

Method step 510 depicts that subsequent to the loading of a PCM sample out of, and incrementing of the index pointing to, storage Buffer B 406, a determination is made as to (1) whether the index pointing within storage Buffer B 406 indicates that the last register of the currently-set storage area of storage Buffer B 406 has been reached and the data within that register transferred out of the register, or (2) whether a signal corresponding to a GPS clock 114 ping has been received. If neither condition is satisfied, the process proceeds to method step 508 and semi-autonomous unit 402 continues transferring PCM samples out of storage Buffer B 406. However, in the event that either the last register of the currently-set storage area of storage Buffer B 206 has been reached and the data within that register transferred, or that a signal correspondent to a GPS clock 114 ping has been received, the process proceeds to method step 512.

Method step 512 depicts that an inquiry is made as to whether the last register of the currently-set storage area of storage Buffer B 406 has been reached and the data therein transferred out (i.e., is the index pointing at a register beyond the defined end of specified storage of storage Buffer B 406). In the event that the last register of the currently-set storage area of storage Buffer B 406 has been reached and the data therein transferred out, the process proceeds to method step 514 wherein it is depicted that semi-autonomous unit 402 retrieves and augments (by either eliminating a number of the last samples in the data from storage Buffer B 406 if the number of samples is too great, or duplicating the last samples in the data from storage Buffer B 406 if the number of samples is too few) the contents of working Buffer A 404 such that the total data block size is correct for storage Buffer B 406 (it being understood that if the size of storage Buffer B 406 is the same as working Buffer A 404, then no augmentation is necessary), and thereafter transfers the (possibly augmented) contents of working Buffer A 404 into storage Buffer B 406.

Data having been transferred from working Buffer A 404 into storage Buffer B 406, method step 516 illustrates that the index is set to the start of storage buffer B 406 so that it can be reemptied. Thereafter, method step 518 indicates that DSP 410 is to utilize CDMA packet-PCM sample decoder 420 to decode a CDMA packet and to place the decoded PCM samples into working Buffer A 404. Thereafter, the process proceeds to method step 520.

Returning to the inquiry of method step 512, in the event that the last register of the currently-set storage area of storage Buffer B 406 has not been reached and the data therein transferred out, the process proceeds to method step 520 which shows the determination as to whether a signal correspondent to a ping of GPS clock 114 has been received subsequent to that discussed in method step 510. In the event that another signal correspondent to a ping of GPS clock 114 has not been received, the process returns to method step 508. In the event that another signal correspondent to a ping of GPS clock 114 has been received, the process proceeds to method step 522.

Method step 522 depicts that the current value of the index pointing within storage Buffer B 406 index is checked to see if the index is equal to the initialized value (recalling that the index is incremented every time a PCM sample is transferred out of storage Buffer B 406, this the value to which it was set in method step 504, provided that the index is set to "wrap," or reset to the initial index value once the last buffer storage register of the currently-set storage area of storage Buffer B 406 has been cleared). If the index is equal to the initialized value, the process proceeds to method step 526 which illustrates that the defined storage area of storage Buffer B 406 is set to its original size.

If the index is not equal to the initialized value, then it is known that a slippage occurred and that the currently-set size of the storage area of storage Buffer B 406 is not correct, so method step 524 shows that the storage area of storage Buffer B 406 is changed so that it equates to the actual number of samples received between the last two signals correspondent to the last two GPS clock 114 pings; that is, the storage buffer is adjusted so that the index will hit its target value (i.e., there will be no slippage) when the next signal correspondent to ping of GPS clock B 114 is received—if the index is behind, the buffer size will be increased, and if the index is ahead, the buffer size will be decreased.

While the invention has been particularly shown and described with reference to a preferred embodiment, it will be understood by those skilled in the art that various changes in form and detail may be made therein without departing from the spirit and scope of the invention.

What is claimed is:

1. A system for preventing data loss in a communications system that comprises a first data network that produces a first data type and a second data network that produces a second data type, wherein said first data network is controlled by a first clock and said second data network is controlled by a second clock different from said first clock, said system comprising:
   a data signal processor (DSP) that encodes/decodes data from said first data type to said second data type and from said second data type to said first data type;
   a first and second buffer that temporarily stores data of one of said first data type and said second data type, wherein a storage capacity of said second buffer is dynamically adjustable; and
   a semi-autonomous processor associated with said DSP, which manages size allocation of said first and second buffers and transfer of data to and from said first and second buffers, wherein said semi-autonomous processor dynamically adjusts the storage capacity of said second buffer during data transmission based on a timing mismatch between said first clock and said second clock.

2. The system of claim 1, wherein said second buffer is an input buffer, said semi-autonomous processor comprising:
   means for dynamically adjusting a storage capacity of said second buffer such that the storage capacity substantially matches a volume of data produced by the second data network during a time interval measured by the first clock.

3. The system of claim 2, wherein said first data network is a CDMA network and said second data network is a PSTN network, wherein said means for dynamically adjusting includes:
   means for dynamically adjusting a storage capacity of an input buffer for PCM samples such that the storage capacity substantially matches a volume of PCM samples produced by said PSTN network during a time interval measured by a clock of said CDMA network.

4. The system of claim 1, wherein said second buffer is an output buffer, said semi-autonomous processor comprising:
   means for dynamically adjusting a storage capacity of said second buffer such that the storage capacity substantially matches a volume of data produced by a decoder that decodes data of said first data network into data of said second data network during a time interval measured by the first clock.

5. The system of claim 4, wherein said first system is a CDMA network and said second system is a PSTN network, wherein said means for dynamically adjusting further comprises:
   means for dynamically adjusting a storage capacity of an output buffer for PCM samples such that the storage capacity substantially matches a volume of PCM samples produced by a CDMA packet-PCM sample decoder during a time interval measured by a clock of said CDMA network.

6. A system for providing seamless data transfer in a communications network that includes a first data providing and receiving system that operates with a first clock signal interfaced with a second data providing and receiving system that operates with a second, different clock signal, said system comprising:
   means for transmitting and receiving a first data type to and from said first data system and a second data type to and from said second data system;
   a digital signal processor (DSP) that encodes and decodes said first data type into said second data type and said second data type into said first data type;
   means for determining a timing mismatch between said first clock signal and said second clock signal, wherein said timing mismatch results in a volume of said first data type communicated during a period of said first clock signal being different from a volume of said second data type communicated during said period;
   means, responsive to said timing mismatch, for dynamically adjusting a volume of data being transferred between said first data system and said second data system to ensure that data are transferred without error due to said timing mismatch.

7. The system of claim 6, further comprising:
   a first buffer that temporarily stores data being coded from a first data type to a second data type;
   a second buffer that stores incoming data of either said first data type or said second data type, wherein a size of said second buffer is dynamically adjustable during receipt and transmission of said incoming data; and
   a semi-autonomous processor that communicates with said digital signal processor and which manages said means for dynamically adjusting said volume of data via said first and said second buffer.

8. The system of claim 7, wherein said first data system is a CDMA network and said second data system is a PSTN network, wherein further:

said system comprises means for receiving PCM samples as input; and said DSP includes a PCM-to-CDMA packet encoder, which receives PCM input data from said second buffer via said first buffer.

9. The system of claim 7, further comprising:

means for generating said first and said second buffer, wherein said first and said second buffer each has a current maximum capacity and said second buffer comprises a plurality of register locations and an index, whose index value is dynamically changeable to correspond to a register location to which it points;

means, responsive to a receipt of a pulse from said second clock, for loading a received second data type into a register location of said second buffer; and means for concurrently incrementing said index value during each storing of a loading of said received second data type, wherein when said index value reaches a register representing the current maximum capacity of said second buffer, said index value is reset to an initial start value when a next pulse is received.

10. The system of claim 9, further comprising:

means for monitoring a receipt of a first ping of said first clock; and means, responsive to the receipt of said first ping, for loading, via said semi-autonomous unit, each subsequent second data type received into said second buffer.

11. The system of claim 10, further comprising:

means for monitoring said index value; and means, responsive to said index value indicating that a last register location of said second buffer has been loaded with data, for retrieving, via said semi-autonomous unit, data contents of said second buffer into said first buffer such that a total volume of data retrieved corresponds to the current maximum capacity of said first buffer.

12. The system of claim 10, wherein said retrieving means comprises:

means for augmenting said data contents when a capacity of said second buffer is not equal to the current maximum capacity of said first buffer; and means for transferring said augmented contents of said second buffer into said first buffer.

13. The system of claim 12, wherein said means for augmenting said data contents includes:

means for eliminating a number of last data packets from said second buffer when said number of data packets is larger than can be stored in said first buffer; and means for duplicating a number of last data packets in said second buffer when said number of data packets is smaller than can be stored in said first buffer.

14. The system of claim 13, further comprising means, responsive to a transfer of data contents from said second buffer, for resetting said index value to a value corresponding to a first register location of said second buffer.

15. The system of claim 13, further comprising means for encoding said data contents transferred to said at buffer into a data type transmitted by said first data system.

16. The system of claim 9, further comprising means, responsive to a receipt of a clock signal from said second clock prior to said index reaching a last register location of said second buffer, for:

restoring an original size of said second buffer, when said value of said index corresponds to a first register location;

changing the current maximum capacity of said second buffer to a next capacity, which accommodates a volume of data received between a first and second most previously received clock signals of said first clock, wherein a capacity of said second buffer is increased when said current maximum capacity is less than that required for storing said volume of data and said capacity is decreased when said current maximum capacity is more than that required for storing said volume of data.

17. The system of claim 6, further comprising:

a first buffer that temporarily stores data that has been decoded from a first data type to a second data type;

a second buffer that receives encoded data from said first buffer and from which said encoded data is issued to said second data system, wherein a size of said second buffer is dynamically adjustable; and a semi-autonomous processor that communicates with said digital signal processor and which manages said means for dynamically adjusting said volume of data via said first and second buffer.

18. The system of claim 17, wherein said first data system is a CDMA network and said second data system is a PSTN network, wherein further:

said DSP includes a CDMA packet-to-PCM sample decoder, which receives CDMA packets as input and decodes said CDMA packets into PCM samples that are stored in said first buffer; and said system comprises means for issuing PCM samples as output from said second buffer via said first buffer.

19. The system of claim 17, further comprising:

means for generating said first and said second buffer, wherein said first and said second buffer have a current maximum capacity and said second buffer comprises a plurality of register locations and an index, whose index value is dynamically changeable to correspond to a register location to which it points;

means, responsive to a receipt of a pulse from said second clock, for issuing a second data type from a register location of said second buffer designated by said index value; and means for concurrently incrementing said index value during each issuing of said second data type, wherein when said index value reaches a current maximum capacity of said second buffer, said index value is reset to an initial start value when a next pulse is received.

20. The system of claim 19, further comprising:

means for monitoring a receipt of a first ping of said first clock; and means, responsive to the receipt of said first ping, for issuing concurrently with a pulse, a subsequent second data type located within said second buffer.

21. The system of claim 20, further comprising:

means for monitoring said index value; and means, responsive to said index value indicating that a last register location of said second buffer has been emptied of data, for retrieving into said second buffer, via said semi-autonomous unit, data contents of said first buffer such that the total volume of data retrieved corresponds to the current maximum capacity of said first buffer.

22. The system of claim 21, wherein said retrieving means comprises:

means for augmenting said data contents of said first buffer when the volume of data that can be stored within said second buffer is not equal to the current maximum capacity of said first buffer; and means for transferring said augmented contents of said first buffer into said second buffer.

23. The system of claim 22, wherein said means for augmenting said data contents includes:
   means for eliminating a number of last data packets from said first buffer when said number of data packets is larger than can be stored in said second buffer; and
   means for duplicating a number of last data packets in said first buffer when said number of data packets is smaller than can be stored in said second buffer.

24. The system of claim 23, further comprising means, responsive to a transfer of data contents from said first buffer, for resetting said index value to correspond to a first register position of said second buffer.

25. The system of claim 23, further comprising means, responsive to a receipt of a clock signal from said second clock prior to said index reaching a last register location of said second buffer, for:
   restoring an original size of said second buffer, when said value of said index is equal to an initial index value; and
   changing the current maximum capacity of said second buffer to a next capacity, which accommodates a volume of data received between a first and second most previously received clock signals of said first clock, wherein a capacity of said second buffer is increased when said current maximum capacity is less than that required for storing said volume of data and capacity is decreased when said current maximum capacity is more than that required for storing said volume of data.

26. The system of claim 6, wherein said first and second data systems comprise of a wireless network and a public switched telephone network (PSTN), wherein further said first clock signal is a GPS clock signal and said second clock signal is a PSTN clock.

27. A method for providing seamless data transmission in a communications network that includes a CDMA network that operates with a first clock signal interfaced with a PSTN network that operates with a second, different clock signal, said method comprising:
   enabling a first buffer and a second buffer having register locations, wherein a capacity of said second buffet is dynamically adjustable;
   determining a timing mismatch between said first clock sign and said second clock signal, wherein said timing mismatch represents that a volume of said CDMA packets communicated during a period of the first clock signal is different from a volume of PCM samples communicated during said period; and
   responsive to said timing mismatch, dynamically adjusting a volume of data being transferred between said first buffer and said second buffer to ensure that said volume corresponds to a correct amount of data that can be transmitted in a seamless manner from said CDMA network to said PSTN network, and vice versa.

28. The method of claim 27, further comprising:
   responsive to a receipt of CDMA packets from said CDMA network to transmit to said PSTN network:
   decoding said CDMA packets into PCM samples;
   storing said PCM samples into said first buffer;
   transmitting said volume of PCM samples from said first buffer to said second buffer; and
   issuing said PCM samples out to said PSTN network from said second buffer.

29. The method of claim 27, further comprising:
   responsive to a receipt of PCM samples from said PSTN network to transmit to said CDMA network:
   storing said PCM samples into said second buffer;
   transmitting said volume of PCM samples from said second buffer to said first buffer;
   encoding said volume of PCM samples in said first buffer into CDMA packets; and
   issuing said CDMA packets out to said CDMA network.

\* \* \* \* \*

UNITED STATES PATENT AND TRADEMARK OFFICE
CERTIFICATE OF CORRECTION

PATENT NO.      : 6,459,696 B1                                              Page 1 of 1
DATED           : October 1, 2002
INVENTOR(S)     : Carpenter et al.

It is certified that error appears in the above-identified patent and that said Letters Patent is hereby corrected as shown below:

<u>Title page,</u>
Item [75], Inventors, please change "Patrick Jackson, Dallas;" to -- Patrick Jackson, Austin; --.

<u>Column 17,</u>
Lines 58-60, please delete "The system of claim 13, further comprising means for encoding said data contents transferred to said at buffer into a data type transmitted by said first data system." and insert instead -- The system of claim 13, further comprising means for encoding said data contents transferred to said first buffer into a data type transmitted by said first data system. --

<u>Column 20,</u>
Lines 3-5, please delete "enabling a first buffer and a second buffer having register locations, wherein a capacity of said second buffet is dynamically adjustable;" and insert instead -- enabling a first buffer and a second buffer having register locations, wherein a capacity of said second buffer is dynamically adjustable; --
Lines 8-12, please delete "determining a timing mismatch between said first clock sign and said second clock signal, wherein said timing mismatch represents that a volume of said CDMA packets communicated during a period of the first clock signal is different from a volume of PCM samples communicated during said period; and" and insert instead -- determining a timing mismatch between said first clock signal and said second clock signal, wherein said timing mismatch represents that a volume of said CDMA packets communicated during a period of the first clock signal is different from a volume of PCM samples communicated during said period; and --

Signed and Sealed this

Eighth Day of April, 2003

JAMES E. ROGAN
*Director of the United States Patent and Trademark Office*